(12) United States Patent
Nave et al.

(10) Patent No.: US 8,550,763 B2
(45) Date of Patent: Oct. 8, 2013

(54) CELL ENGAGEMENT AND RETENTION CARRIAGE

(75) Inventors: Shawn Michael Nave, Tucson, AZ (US); Raymond Yardy, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 401 days.

(21) Appl. No.: 12/895,531

(22) Filed: Sep. 30, 2010

(65) Prior Publication Data

US 2012/0082533 A1    Apr. 5, 2012

(51) Int. Cl.
*B65G 65/00* (2006.01)

(52) U.S. Cl.
USPC ............................................ 414/284; 414/561

(58) Field of Classification Search
USPC ............... 414/267, 277, 281, 284, 225.01, 414/226.02, 373, 389, 390, 391, 401, 402, 414/409, 416.02, 444, 498, 560, 561, 589, 414/608, 610, 612, 615, 618, 645, 646, 654, 414/656, 658, 660, 785, 749.1
See application file for complete search history.

(56) References Cited

U.S. PATENT DOCUMENTS

| | | | | |
|---|---|---|---|---|
| 2,545,170 A * | 3/1951 | Saunders | | 414/646 |
| 2,995,264 A * | 8/1961 | Thomas | | 414/658 |
| 4,591,934 A | 5/1986 | Sims, Jr. | | 360/93 |
| 4,972,277 A | 11/1990 | Sills et al. | | 360/92 |
| 5,053,903 A * | 10/1991 | Harney et al. | | 360/99.06 |
| 5,101,387 A | 3/1992 | Wanger et al. | | 369/36 |
| 5,535,653 A * | 7/1996 | Berns et al. | | 82/127 |
| 5,870,245 A | 2/1999 | Kersey et al. | | |
| 5,898,593 A | 4/1999 | Baca et al. | | 364/478.02 |
| 5,975,450 A | 11/1999 | Leger et al. | | 242/337 |
| 6,005,745 A | 12/1999 | Filkins et al. | | 360/92 |
| 6,198,593 B1 | 3/2001 | Hori et al. | | 360/92 |
| 6,377,419 B1 * | 4/2002 | Beal et al. | | 360/92.1 |
| 6,457,928 B1 * | 10/2002 | Ryan | | 414/281 |
| 6,819,525 B2 | 11/2004 | Brace et al. | | 360/92 |
| 6,837,670 B2 * | 1/2005 | Goodrich | | 414/546 |
| 6,930,855 B2 | 8/2005 | Gupta et al. | | 360/92 |
| 6,956,714 B2 | 10/2005 | Oohara et al. | | 360/92 |
| 7,145,747 B2 | 12/2006 | Brace et al. | | 360/92 |
| 7,369,353 B1 | 5/2008 | Gupta et al. | | |
| 7,480,118 B2 | 1/2009 | Ojima et al. | | 360/92 |

(Continued)

OTHER PUBLICATIONS

USPTO Office Action, U.S. Appl. No. 13/453,763, dated Aug. 15, 2012.

*Primary Examiner* — Saul Rodriguez
*Assistant Examiner* — Glenn Myers
(74) *Attorney, Agent, or Firm* — John H. Holcombe

(57) ABSTRACT

A carriage with a cell carrier engages and retains a vertically driven cell so that the cell and its contents, such as a data storage cartridge, may be moved laterally from one linear library to another. A portal engagement device of the cell carrier includes a movable rack so that a pinion of the cell may move up or down the rack, and has pins that, when the device is down, engage a library vertical portal having a fixed rack. A cam state machine of the cell carrier guides a spring loaded cam follower hook of the cell in a pattern to lock the hook in position and, when hooked, attempted downward movement of the vertically driven cell moves the portal engagement device upward to disengage the pins of the portal engagement device from the vertical portal. The carriage may then transport the cell to another vertical portal.

15 Claims, 11 Drawing Sheets

(56) References Cited

U.S. PATENT DOCUMENTS 7,483,344 B2  1/2009  Collins et al. .............. 369/30.43
2006/0188361 A1  8/2006  Fairchild et al. .............. 414/277
2008/0282281 A1  11/2008  White .......................... 720/728
2009/0213490 A1  8/2009  Green et al. ................. 360/92.1

* cited by examiner

CELL ENGAGEMENT AND RETENTION CARRIAGE

DOCUMENT INCORPORATED BY REFERENCE

Commonly assigned U.S. patent application Ser. No. 12/038,551, Filed Feb. 27, 2008, is incorporated for its showing of a pass through mechanism for linear tape libraries.

FIELD OF THE INVENTION

This invention relates to carriage mechanisms, and more particularly to carriages for engaging and retaining cells, for example of a pass through system for cells transporting data storage cartridges of data storage libraries.

BACKGROUND OF THE INVENTION

Data storage libraries provide data storage slots for storing data storage cartridges, and robots to move the cartridges between the slots and data storage drives.

As pointed out in the commonly assigned '551 Patent Application, in order to provide large data storage libraries, linear libraries may be added side by side, and a pass-through system allows tape cartridges to be moved between the linear data storage libraries. Cells are specialized movable slots that can hold data storage cartridges and can transport the cartridges in the pass-through system.

SUMMARY OF THE INVENTION

Carriages, carriages with cell carriers, and pass-through mechanisms are provided for engaging and retaining a vertically driven cell so that the cell and its contents, such as a data storage cartridge may be moved from one linear library to another.

In one embodiment, a carriage with a cell carrier engages and retains a vertically driven cell so that the cell and its contents, such as a data storage cartridge, may be moved laterally from one linear library to another. A portal engagement device of the cell carrier includes, for example, a movable rack so that a pinion of the cell may move the cell up or down the rack, and has pins that, when the portal engagement device is down, engage a library vertical portal having a fixed rack. A cam state machine of the cell carrier guides a cam follower hook of the cell in a pattern to lock the hook in position and, when hooked, attempted downward movement of the vertically driven cell moves the portal engagement device rack upward to disengage the pins of the portal engagement device from the vertical portal. The carriage may then transport the cell to another vertical portal.

In another embodiment, a carriage comprises a cell carrier; a portal engagement device having limited vertical movement with respect to the cell carrier, the portal engagement device configured to engage a vertical portal; and a cam state machine fixed to the cell carrier. The cam state machine is configured to:

(A) when the portal engagement device is engaged with the vertical portal and receiving the vertically driven cell from the vertical portal, guide a spring loaded cam follower hook of the cell sideways from a center position as the cell is driven vertically from the vertical portal to the portal engagement device;

(B) allow spring bias movement of the spring loaded cam follower hook back towards and short of the center position; and (C) engage the cam follower hook against downward movement, the cam follower hook thereby supporting the cell with respect to the cell carrier, and thereby engaging the cell, and retaining the cell against downward vertical movement with respect to the cell carrier, such that attempted downward movement of the vertically driven cell moves the portal engagement device upward to disengage the portal engagement device from the vertical portal.

In a another embodiment, the carriage additionally comprises an interlock gate inserted at the cam state machine to prevent further spring bias movement of the spring loaded cam follower hook from the position of state (C).

In still another embodiment, the cell carrier is additionally configured to:

engage the cell against upward movement, such that attempted upward movement of the vertically driven cell moves the portal engagement device downward to engage the portal engagement device with respect to a vertical portal.

In a further embodiment, the carriage cam state machine is additionally configured to: in state (D), allow spring bias movement of the spring loaded cam follower hook back to the center position; and (E) guide the spring loaded cam follower hook of the cell as the cell is driven vertically from the portal engagement device to the vertical portal to thereby disengage the cell from the cell carrier.

In a still further embodiment, the carriage additionally comprises an interlock gate inserted at the cam state machine to prevent further spring bias movement of the spring loaded cam follower hook from the position of state (C); the interlock gate withdrawn at state (D).

In yet a further embodiment, the carriage additionally comprises an interlock cam of the gate with respect to the portal engagement device, such that the upward movement of the portal engagement device inserts the interlock gate, and the downward movement of the portal engagement device releases the interlock gate to allow withdrawal of the interlock gate.

In another embodiment, the carriage portal engagement device comprises at least one rack configured to engage at least one pinion of a cell, the pinion(s) configured to drive the cell vertically, and the portal engagement device comprises at least one pin configured to engage a vertical portal.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
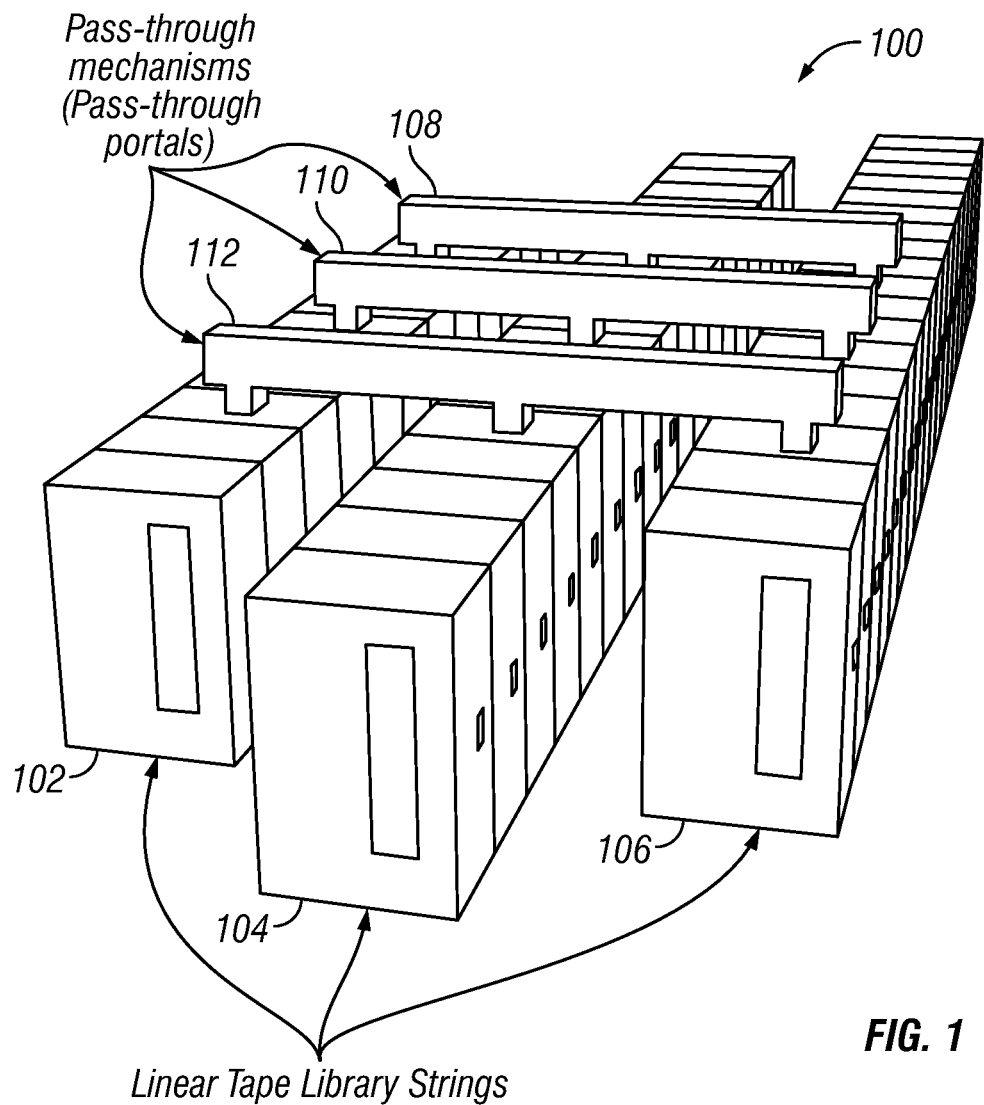
FIG. 1 is an illustration of a three dimensional view of a pass-through mechanism which may implement the present invention.

Referring to FIG. 1, diagram 100 shows three linear data storage libraries 102, 104 and 106 are coupled via three exemplary pass-through systems 108, 110 and 112. While three libraries and three pass-through systems are illustrated, in alternative embodiments, fewer or greater numbers of libraries and fewer or greater numbers of pass-through systems may be present.

The pass-through systems 108, 110 and 112 are in an overhead position with respect to the linear data storage libraries 102, 104 and 106. As pointed out in the '551 Application, the pass-through systems 108, 110 and 112 may be placed over the tops of the linear data storage libraries 102, 104 and 106 and below the room ceiling to allow walking access underneath the pass-through systems.

Figure 2B:
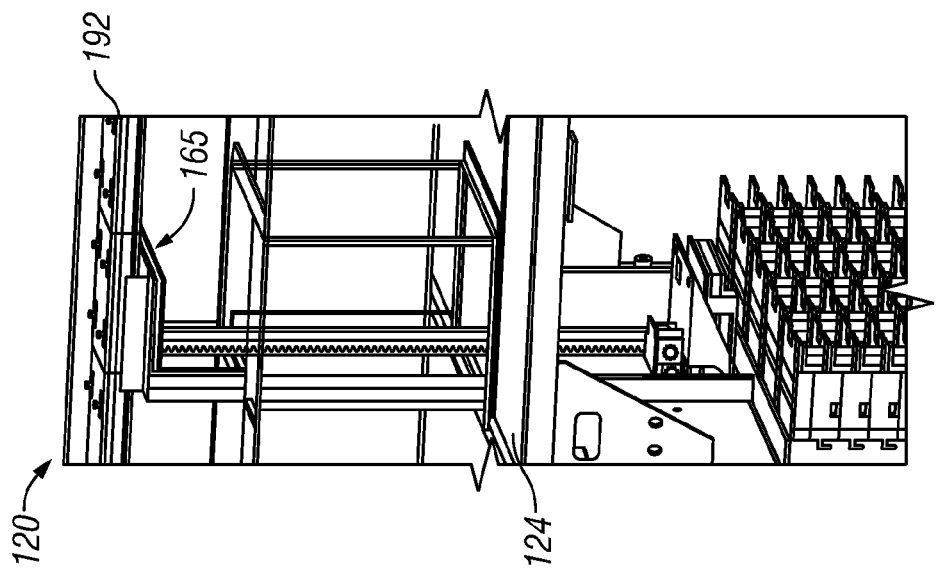
FIGS. 2A and 2B are illustrations of three dimensional views of a vertical portal and cell that may be driven vertically and that may be implemented in the pass-through mechanism of FIG. 1.
Figure 2A:
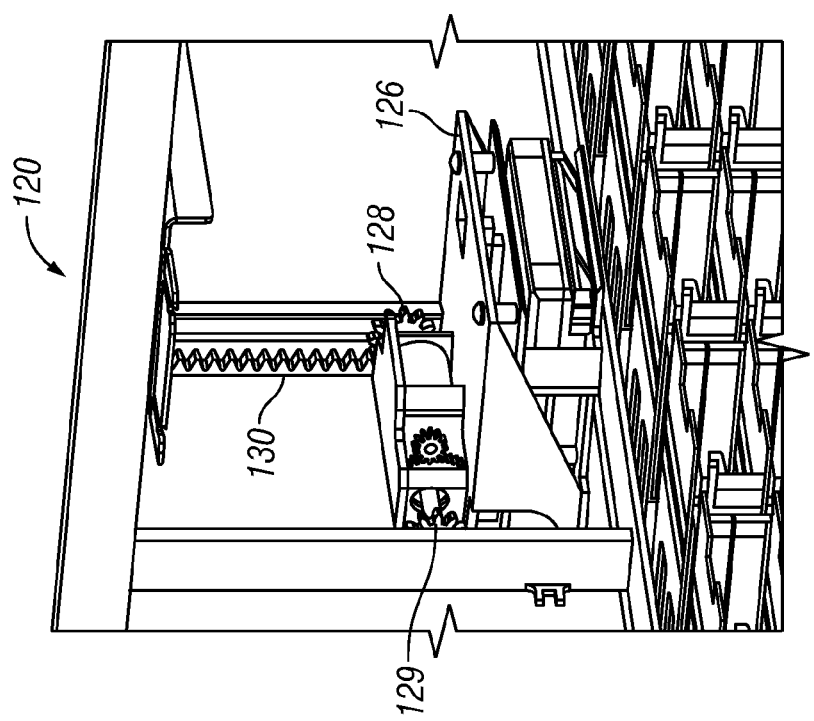

Referring to FIGS. 2A and 2B, a vertical portal 120 is shown with the top of a library frame being indicated by reference numeral 124. A cell 126 is shown with a drive mechanism to rotate at least one pinion 128 to drive the cell up and down at least one fixed rack 130 of the vertical portal 120, such that the cell may be vertically driven up and beyond the top of the library frame 124 in the vertical portal 120. One or more data storage cartridges may be loaded into the cell 126, for example by a robot accessor of the library, to be transported by the cell.

Figure 3:
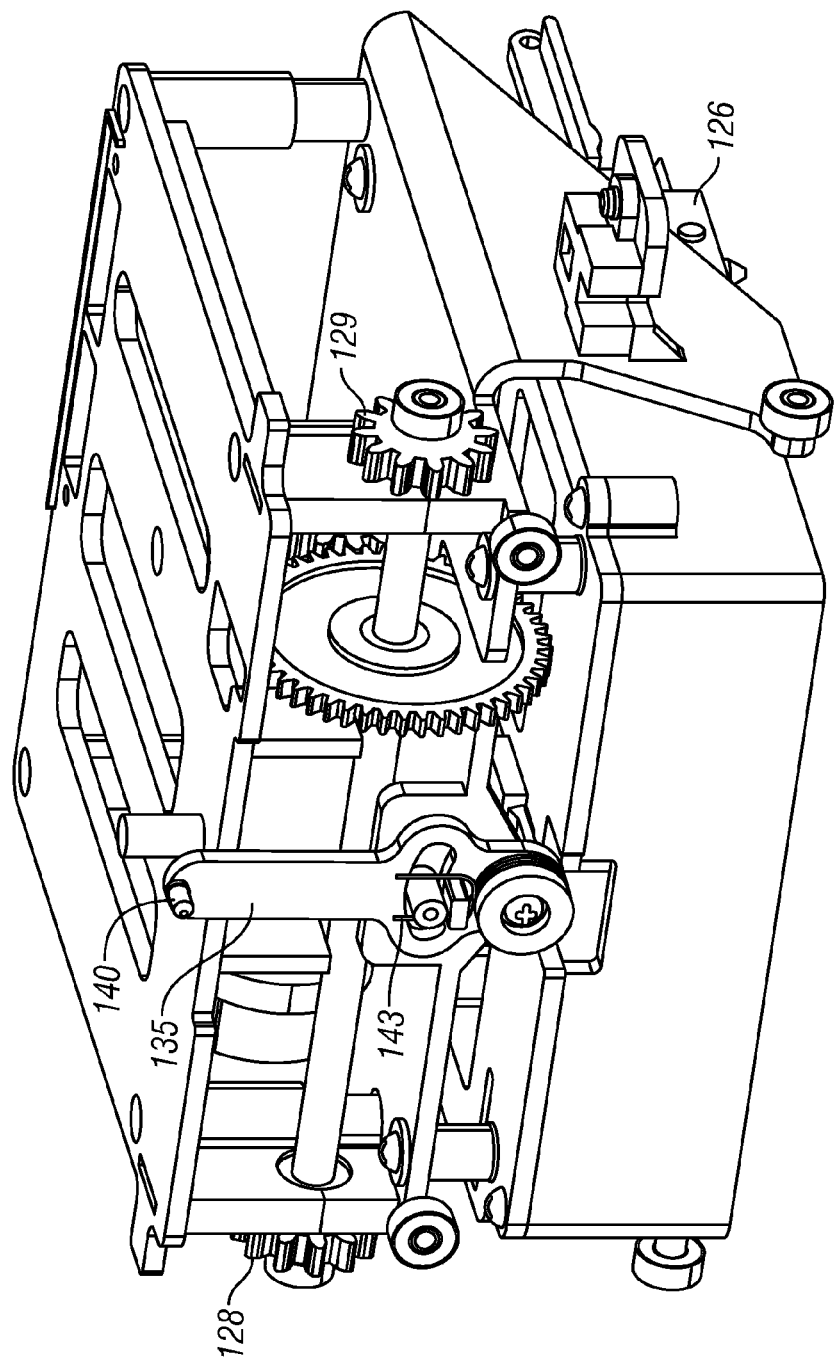
FIG. 3 is an illustration of a three dimensional view of the cell of FIGS. 2A and 2B with a spring loaded cam follower hook of the cell in accordance with an embodiment of the present invention.

In FIG. 3, the cell 126 has a cam follower 135 with a hook 140 which follows a cam track, as will be discussed, and a torsion spring 143 for biasing the cam follower. The unit 135 is called herein a spring loaded cam follower hook, a cam follower, and a hook, depending on the situation or the portion of the unit being discussed. Two pinions 128 and 129 of FIG. 2A are also shown in FIG. 3.

In one embodiment, the spring 143 is arranged to be a centering spring which allows the cam follower hook to be moved in either of two directions from a center rest position, and the spring biases the cam follower hook back to the rest position. In an alternative embodiment, the spring 143 biases the cam follower hook in a single direction, towards the rest position, and a stop prevents the cam follower hook from moving beyond the rest position.

Figure 4:
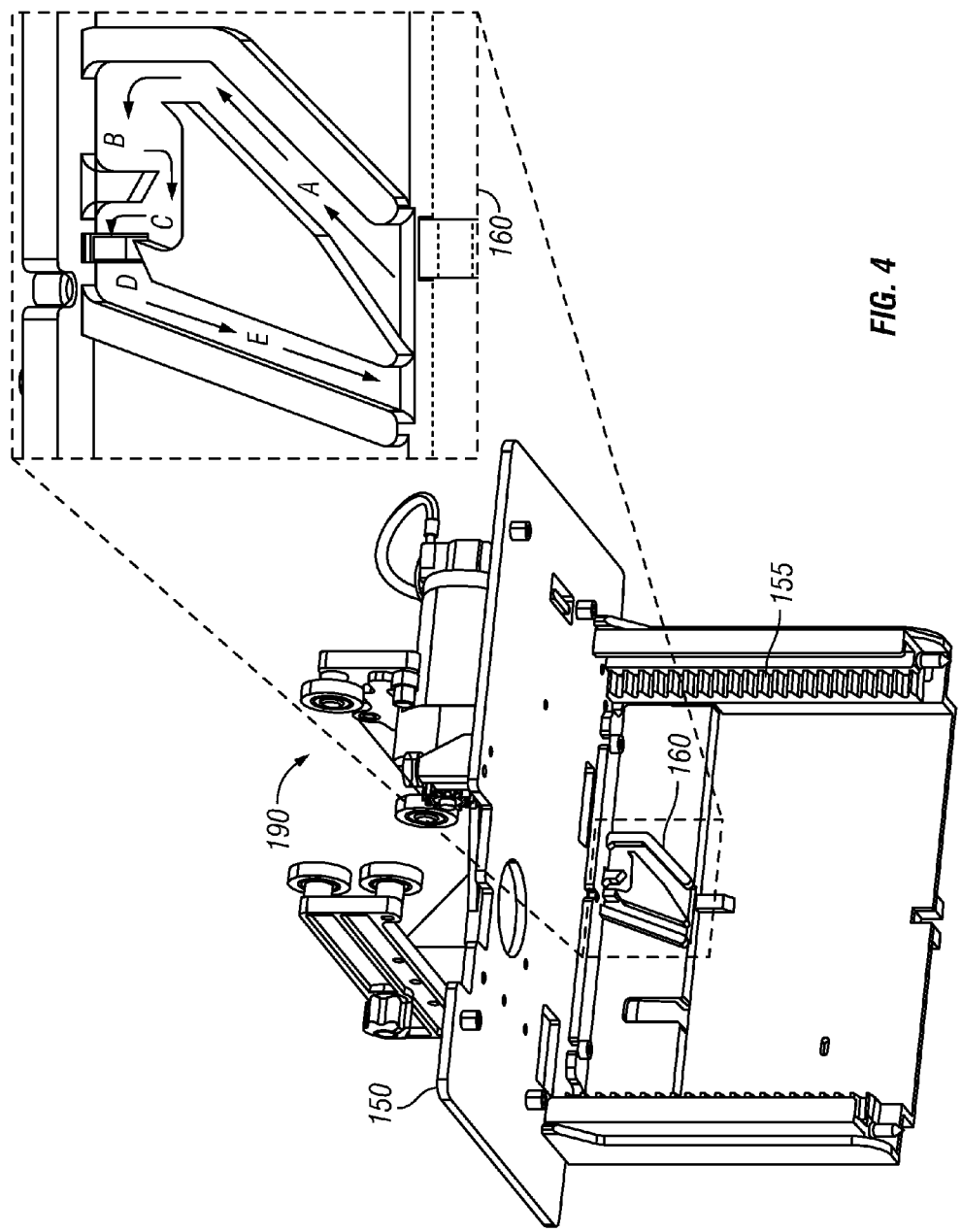
FIG. 4 is an illustration of a three dimensional view of a cell carrier in accordance with an embodiment of the present invention, showing an expanded view of a cam state machine.

FIG. 4 illustrates a carriage 165 with a drive mechanism 190 and a cell carrier 150, the cell carrier having a movable portion including a movable rack 155. The movable portion is called herein a portal engagement device. The cell carrier also has in a fixed portion a cam state machine 160 which comprises a cam track. The cam track follows a path with several individual positions or paths representing various sequential states followed by the spring loaded cam follower hook 135 of FIG. 3. The movable portion of the cell carrier is movable with respect to the fixed portion. The entire cell carrier, including the "fixed portion", is part of the carriage 165 which may move laterally in the pass through.

Figure 5:
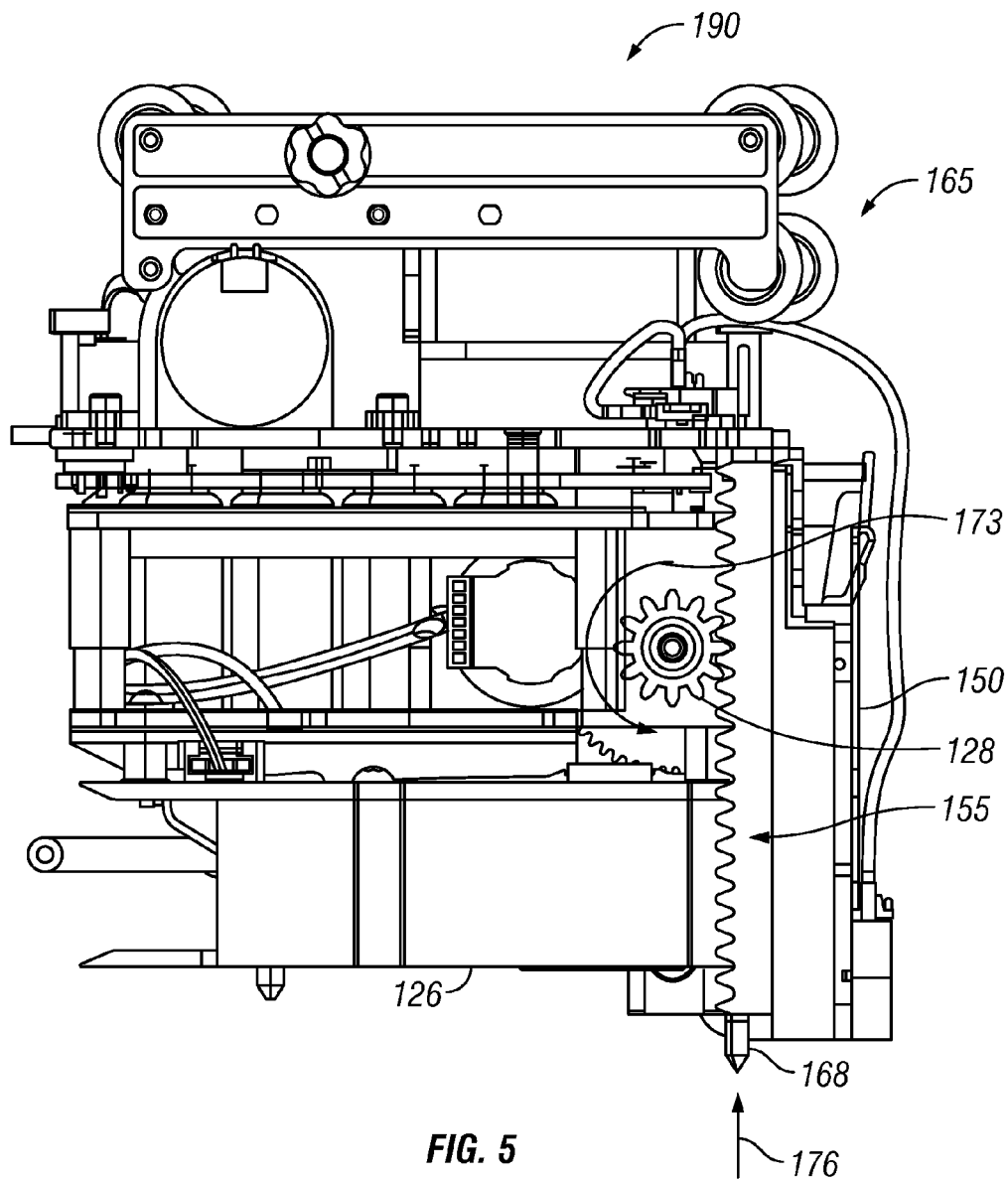
FIG. 5 is an illustration of the cell and cell carrier of FIGS. 2A, 2B and 3 arranged to operate in a first direction.

FIG. 5 is a side view of a carriage 165 including the cell carrier 150 of FIG. 4 with movable rack 155, and of the cell 126 of FIG. 3 showing pinion 128. The portal engagement device 155 also comprises at least one pin 168 which may engage the fixed rack 130 of the vertical portal 120 of FIG. 2A.

The preferred embodiment of the cell 126, the portal engagement device 155 and of the vertical portal 120 comprises a rack and pinion arrangement to move the cell and the portal engagement device up and down. However, alternative arrangements are contemplated, such as a friction drive, a wire or cable and drum drive, etc.

Referring to FIGS. 2A, 2B, 3, 4, 5 and 10, in step 169, the carriage 165 is positioned at the vertical portal, and pins 168 of the portal engagement device 155 are engaged with the vertical portal 120. The cell 126, in step 171, through pinions 128 and 129, moves upwards in the vertical portal 120 along the fixed rack 130 so that the cell carrier 150 receives the vertically driven cell from the vertical portal, and also in step 171 the cam state machine guides the spring loaded cam follower hook 135 of the cell sideways from the rest position in state A of the cam state machine 160.

The spring loaded cam follower hook follows the path A until the cell mechanism 126 reaches the top of its motion, where the cam of the cam state machine, in step 172, releases the follower hook to move under its spring bias force (spring 143) towards, but short of, the rest position and to the location of state B in the cam state machine 160.

In step 174, the cell motor is reversed, driving pinions 128 and 129 in the direction of arrow 173, moving the cam follower hook 135 to state C of the cam state machine 160, where it is engaged in position C by the downward movement and pressure against the cam in combination with further spring bias force by the spring 143 and locked against further downward movement by the cam. Thus, the cam follower hook 135 is engaged by the cam follower hook against downward movement, the cam follower hook thereby supporting the cell 126 with respect to the cell carrier 150, and thereby retaining the cell against downward vertical movement with respect to the cell carrier. In step 174, attempted further downward movement of the vertically driven cell by the motor driving pinions 128 and 129 in the direction of arrow 173 instead moves the portal engagement device or movable rack 155 upward 176 to disengage pins 168 of the portal engagement device from the vertical portal.

When the portal engagement device is disengaged from the vertical portal, the carriage 165 may then transport the cell to another vertical portal.

Figure 6:
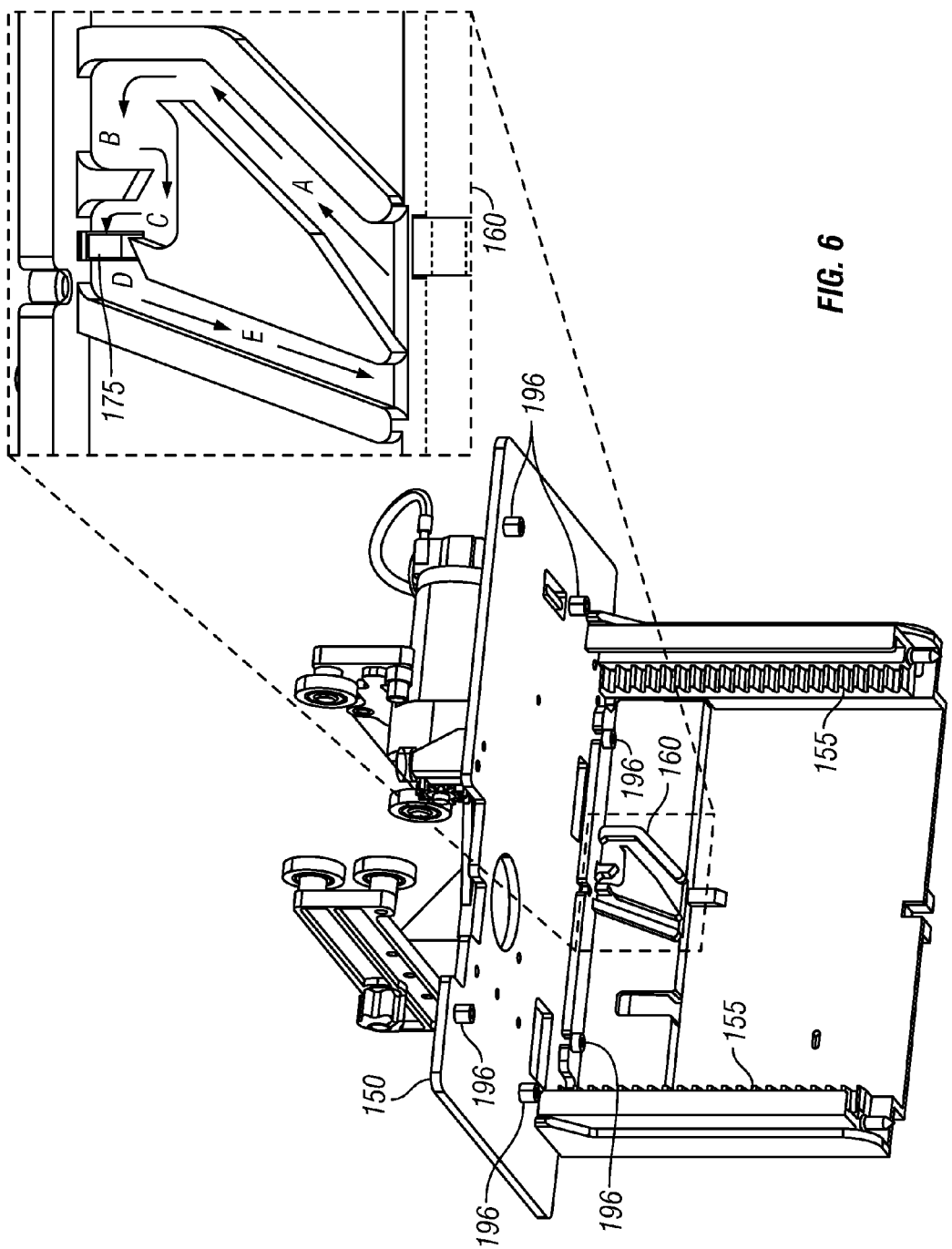
FIG. 6 is an illustration of a three dimensional view of the cell carrier of FIG. 4, showing an expanded view of a cam state machine and an interlock gate.
Figure 7:
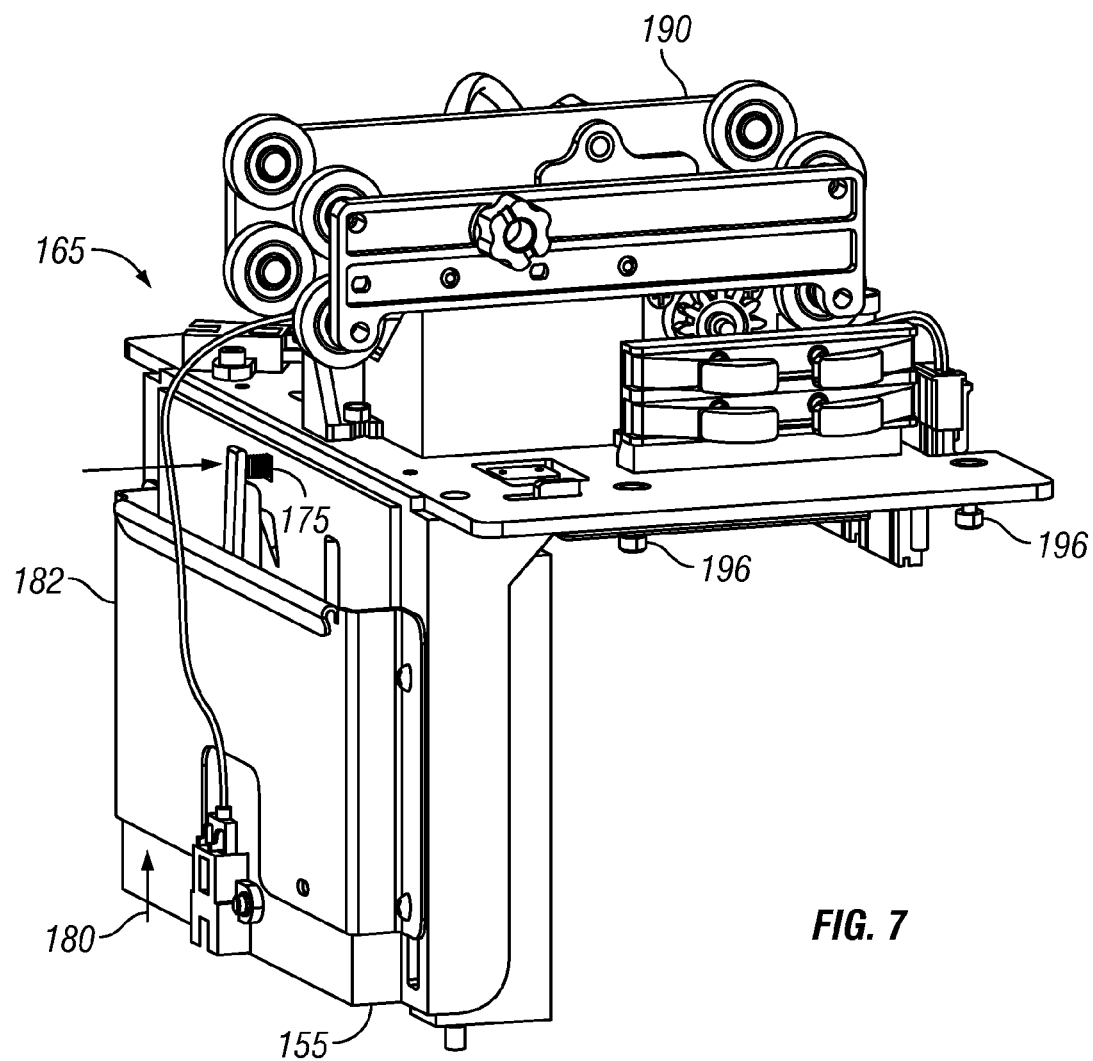
FIG. 7 is an illustration of a three dimensional view of the cell carrier of FIG. 6, showing the operation of the interlock gate.
Figure 10:
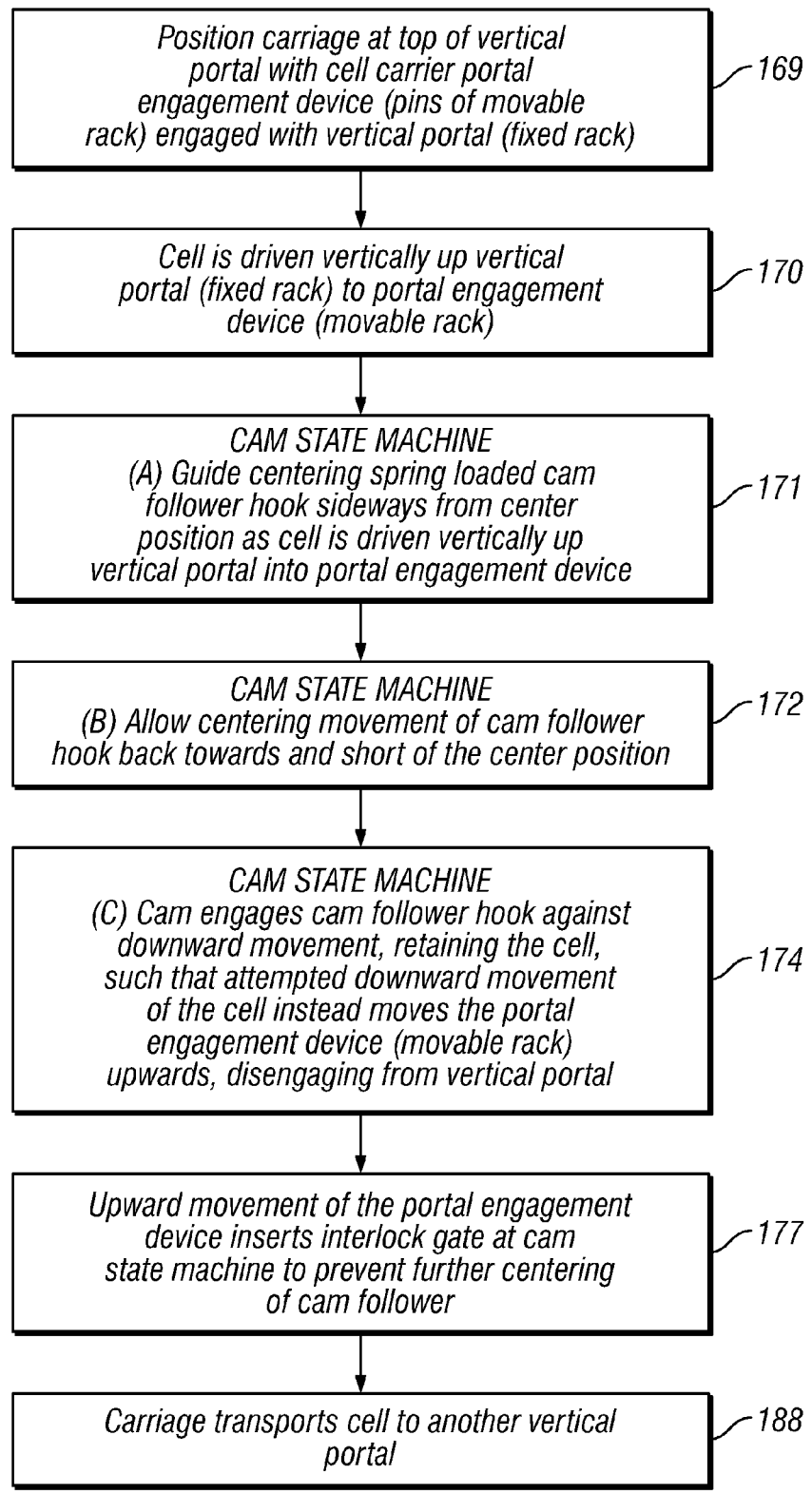
FIG. 10 is a flow chart depicting an exemplary method of operating the system of FIGS. 1 through 7.

Referring to FIGS. 6, 7 and 10, the carriage 165 additionally comprises an interlock gate 175 that is spring loaded to be outside the cam state machine, but in step 177 is inserted at the cam state machine 160 by the upward movement 180 of plate 182 of the portal engagement device 155. The plate 182 acts as a cam against the gate 175, and additionally connects the sections of the movable rack. Insertion of the interlock gate 175 blocks further centering movement of the spring loaded cam follower hook 135 from the position of state C.

As the result, the combination of the spring bias by spring 143 of FIG. 3, the cam state machine position C, and the added insurance of the interlock gate 175, retain and lock the cell 126 in position in the cell carrier 150 of the carriage 165. With the cell 126 supported by the cell carrier, the cell motor can be powered off.

Referring to FIGS. 2B, 4, 5, 7 and 10, in step 188, the drive mechanism 190 of carriage 165 may then drive the carriage and its cell along rail 192 of a pass-through mechanism to another vertical portal.

Referring to FIGS. 2A, 2B, 6, 7, 8 and 11, in step 189, when the carriage 165 reaches a desired vertical portal 120 as driven by drive mechanism 190 where the cell 126 needs to descend into a library, the motor of the cell is re-energized to lift the cell. In step 192, cell carrier 150 prevents further upward movement of the cell in the cell carrier. Thus, the rotation of the pinions 128 and 129 in the direction of arrow 195, instead of driving the cell upwards, moves the portal engagement device or movable rack 155 downward 198 to engage pins 168 of the portal engagement device with the fixed rack 130 of the vertical portal 120. In a preferred embodiment, mechanical stops 196 of cell carrier 150 prevent upward movement of the cell. In an additional or alternative embodiment, the top of the cam of the cam state machine 160 prevents further upward movement of the hook 140 to prevent upward movement of the cell.

Figure 9:
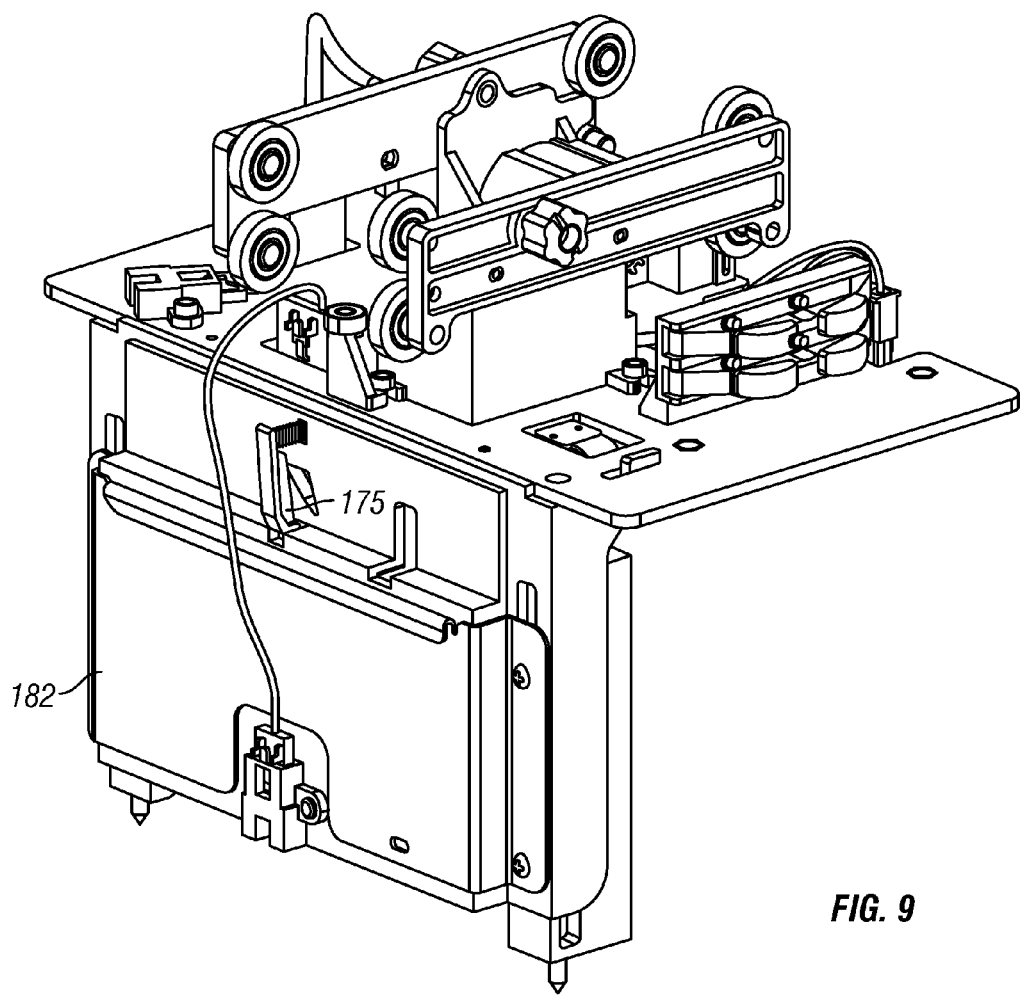
FIG. 9 is an illustration of a three dimensional view of the cell carrier of FIG. 8, showing the operation of the interlock gate.
Figure 11:
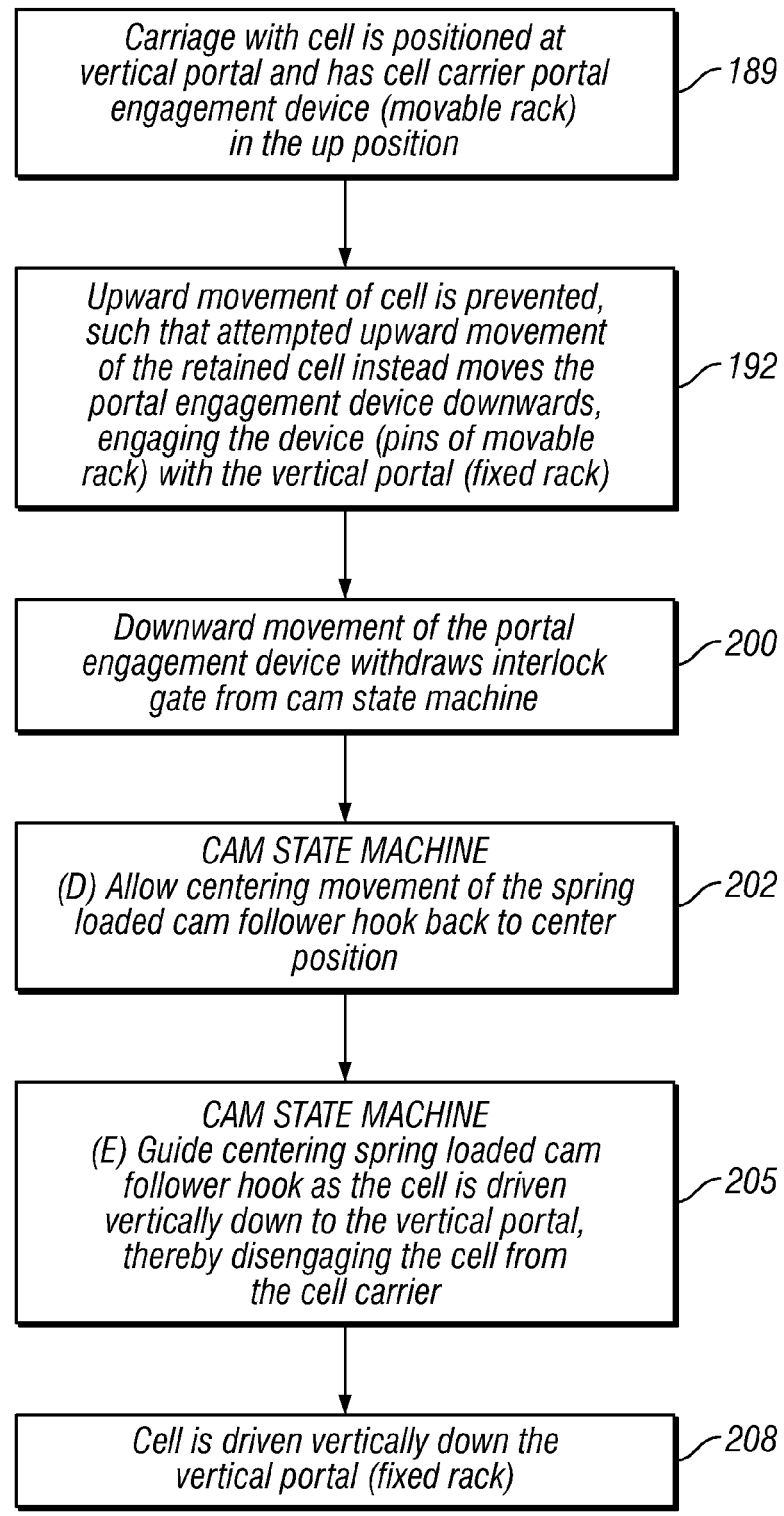
FIG. 11 is a flow chart depicting an exemplary method of operating the system of FIGS. 8 and 9.

Referring to FIGS. 6, 9 and 11, in step 200, the downward movement of the portal engagement device 155 plate 182 of carriage 165 frees the interlock gate 175 that is spring loaded to withdraw from the cam state machine 160. Withdrawal of the interlock gate 175 opens the cam state machine 160 so that in step 202, further spring bias movement of the spring loaded cam follower hook 135 moves the hook from the position of state C to state D, releasing the hook 135 and the cell 126.

Figure 8:
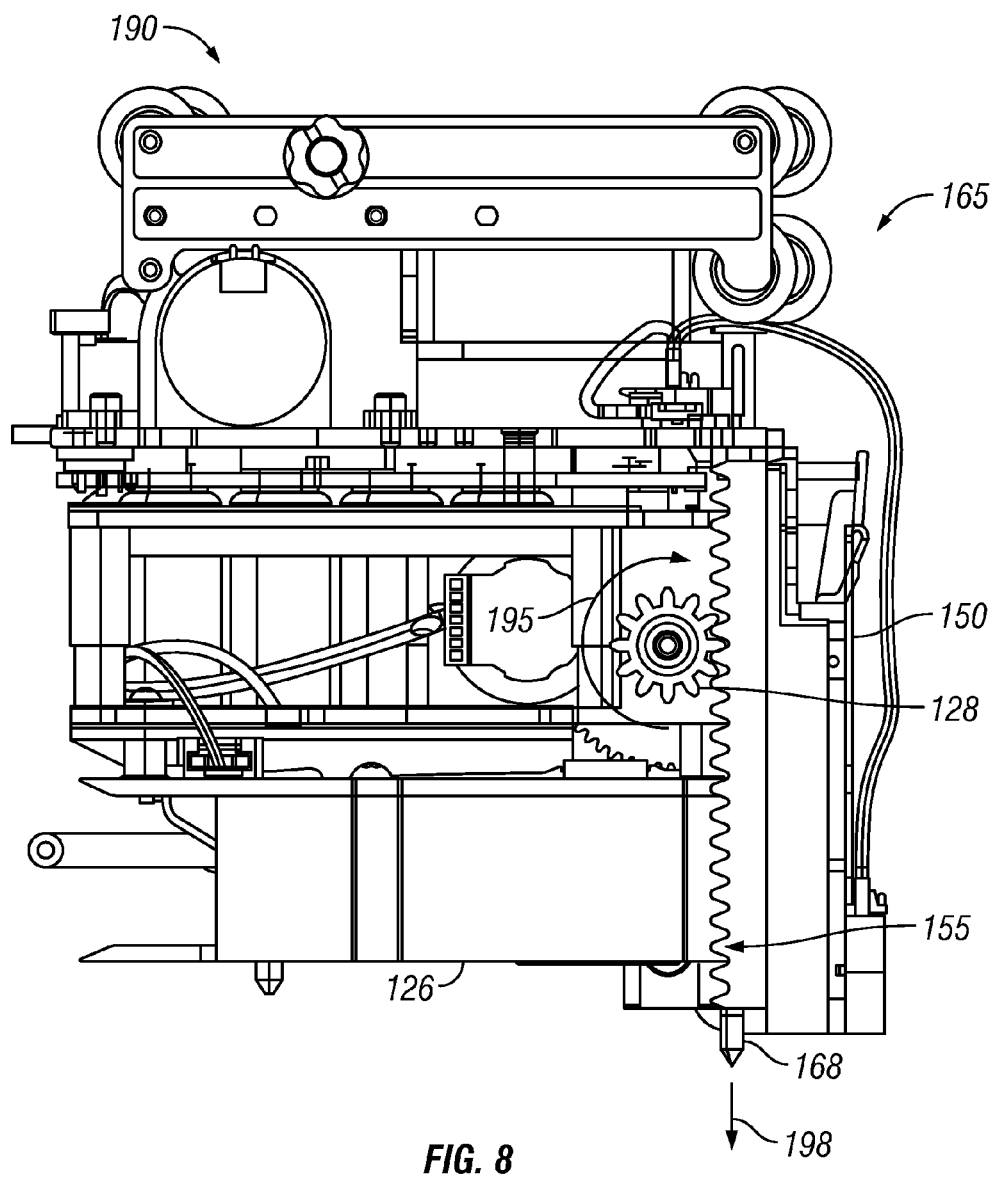
FIG. 8 is an illustration of the cell and cell carrier of FIGS. 2A, 2B and 3 arranged to operate in the reverse of the first direction of FIG. 5.

Referring additionally to FIGS. 2A, 2B and 8, in step 205, reversal of the drive pinions of the cell 126 drives the cell downward while the spring loaded cam follower hook 135 follows the cam down the path of state E, and out of the cam state machine 160. In step 208, continued movement of the cell downward engages the cell with the fixed rack 130, driving the cell into the library. When released by the cam state machine, the spring loaded cam follower hook 135 returns to its center rest position.

Thus, referring to FIGS. 2A, 2B, 3, 4, 5, 6, 8, 9, 10 and 11, the cell 126 is driven into the carriage 165 at one vertical portal 120, is retained in the carriage by the cam state machine 160 and the cam follower hook 135 and the carriage is disengaged from the vertical portal. The cell is transported to another vertical portal 120, where the carriage engages the vertical portal, the cam state machine 160 disengages the cam follower hook 135 and the cell, and the cell 126 is driven into the library. The cell may be accessed by, for example, by a robot accessor of the library, to remove the one or more cartridges therein to be transported within the library.

The implementations may involve software, firmware, micro-code, hardware and/or any combination thereof to drive the motors that operate the pinions 128, 129 and drive mechanism 190. The operations herein may be implemented in the cell, carriage and library in the form of code or logic implemented in a medium, where the medium may comprise hardware logic (e.g. an integrated circuit chip, Programmable Gate Array [PGA], Application Specific Integrated Circuit [ASIC], or other circuit, logic or device), or a computer readable storage medium, such as a magnetic storage medium (e.g. an electronic, magnetic, optical, electromagnetic, infrared, or semiconductor system, semiconductor or solid state memory, magnetic tape, a removable computer diskette, and random access memory [RAM], a read-only memory [ROM], a rigid magnetic disk and an optical disk, compact disk-read only memory [CD-ROM], compact disk-read/write [CD-R/W] and DVD).

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A carriage for engaging and retaining a vertically driven cell comprising:
   a cell carrier;
   a portal engagement device having limited vertical movement with respect to said cell carrier, said portal engagement device configured to engage a vertical portal;
   a cam state machine fixed to said cell carrier configured to:
   A. when said portal engagement device is engaged with said vertical portal and receiving said vertically driven cell from said vertical portal, guide a spring loaded cam follower hook of said cell sideways from a rest position as said cell is driven vertically from said vertical portal to said portal engagement device;
   B. allow spring bias movement of said spring loaded cam follower hook back towards and short of said rest position; and
   C. engage said cam follower hook against downward movement, said cam follower hook thereby supporting said cell with respect to said cell carrier, and thereby engaging said cell, and retaining said cell against downward vertical movement with respect to said cell carrier, such that further downward vertical drive of said vertically driven cell from said portal engagement device instead moves said portal engagement device upward to disengage said portal engagement device from said vertical portal; and
   an interlock gate inserted at said cam state machine to prevent further spring bias movement of said spring loaded cam follower hook from said position of state C;
   wherein said cell carrier is additionally configured to:
   engage said cell against upward movement, such that further upward vertical drive of said vertically driven cell from said portal engagement device instead moves said portal engagement device downward to engage said portal engagement device with respect to a vertical portal.

2. The carriage of claim 1, wherein said cam state machine is additionally configured to:
   D. allow spring bias movement of said spring loaded cam follower hook back to said rest position; and
   E. guide said spring loaded cam follower hook of said cell as said cell is driven vertically from said portal engagement device to said vertical portal to thereby disengage said cell from said cell carrier.

3. The carriage of claim 2, additionally comprising an interlock gate inserted at said cam state machine to prevent further spring bias movement of said spring loaded cam follower hook from said position of state C.; said interlock gate withdrawn at state D.

4. The carriage of claim 3, additionally comprising an interlock cam of said gate with respect to said portal engagement device, such that said upward movement of said portal engagement device inserts said interlock gate, and said downward movement of said portal engagement device releases said interlock gate to allow withdrawal of said interlock gate.

5. The carriage of claim 1, wherein said portal engagement device comprises at least one rack configured to engage at least one pinion of a cell, said at least one pinion configured to drive said cell vertically, and said portal engagement device comprises at least one pin configured to engage a vertical portal.

6. A carriage and a cell engageable by said carriage, comprising:
   a cell capable of vertical movement within a vertical portal; and
   a carriage, comprising:
   a cell carrier;
   a portal engagement device having limited vertical movement with respect to said cell carrier, said portal engagement device configured to engage a vertical portal; and
   a cam state machine fixed to said cell carrier configured to:
   A. when said portal engagement device is engaged with said vertical portal, and receiving said vertically driven cell from said vertical portal, guide a spring loaded cam follower hook of said cell sideways from a rest position as said cell is driven vertically from said vertical portal to said portal engagement device;
   B. allow spring bias movement of said spring loaded cam follower hook back towards and short of said rest position; and
   C. engage said cam follower hook against downward movement, said cam follower hook thereby supporting said cell with respect to said cell carrier, and thereby engaging said cell, and retaining said cell against downward vertical movement with respect to said cell carrier, such that further downward vertical drive of said vertically driven cell from said portal engagement device instead moves said portal engagement device upward to disengage said portal engagement device from said vertical portal;
   wherein said cell carrier is additionally configured to:
   engage said cell against upward movement, such that further upward vertical drive of said cell from said portal engagement device instead moves said portal engagement device downward to engage said portal engagement device with respect to a vertical portal.

7. The carriage and cell of claim 6, wherein said cam state machine is additionally configured to:
   D. allow spring bias movement of said spring loaded cam follower hook back to said rest position; and
   E. guide said spring loaded cam follower hook of said cell as said cell is driven vertically from said portal engagement device to said vertical portal to thereby disengage said cell from said cell carrier.

8. The carriage and cell of claim 7, additionally comprising an interlock gate inserted at said cam state machine to prevent further spring bias movement of said spring loaded cam follower hook from said position of state C.; said interlock gate withdrawn at state D.

9. The carriage and cell of claim 8, additionally comprising an interlock cam of said gate with respect to said portal engagement device, such that said upward movement of said portal engagement device inserts said interlock gate, and said downward movement of said portal engagement device releases said interlock gate to allow withdrawal of said interlock gate.

10. The carriage and cell of claim 6, wherein said portal engagement device comprises at least one rack configured to engage at least one pinion of said cell, said at least one pinion configured to drive said cell vertically, and said portal engagement device comprises at least one pin configured to engage a vertical portal.

11. A pass-through mechanism for multiple linear data storage libraries, comprising
   a transport rail system extending laterally between said multiple linear data storage libraries;
   a vertical portal at each of said multiple linear data storage libraries positioned at said transport rail system;
   a cell capable of vertical movement within each of said vertical portals; and
   a carriage, comprising:
   a cell carrier;
   a portal engagement device having limited vertical movement with respect to said cell carrier, said portal engagement device configured to engage a vertical portal; and
   a cam state machine fixed to said cell carrier configured to:
   A. when said portal engagement device is engaged with said vertical portal, and receiving said vertically driven cell from said vertical portal, guide a spring loaded cam follower hook of said cell sideways from a rest position as said cell is driven vertically from said vertical portal to said portal engagement device;
   B. allow spring bias movement of said spring loaded cam follower hook back towards and short of said rest position; and
   C. engage said cam follower hook against downward movement, said cam follower hook thereby supporting said cell with respect to said cell carrier, and thereby engaging said cell, and retaining said cell against downward vertical movement with respect to said cell carrier, such that further downward vertical drive of said vertically driven cell from said portal engagement device instead moves said portal engagement device upward to disengage said portal engagement device from said vertical portal, whereby said transport rail system may transport said carriage and said engaged cell from said vertical portal to another said vertical portal;
   wherein said cell carrier is additionally configured to:
   engage said cell against upward movement, such that further upward vertical drive of said cell from said portal engagement device instead moves said portal engagement device downward to engage said portal engagement device with respect to a vertical portal.

12. The pass-through mechanism of claim 11, wherein said cam state machine is additionally configured to:
   D. allow spring bias movement of said spring loaded cam follower hook back to said rest position; and
   E. guide said centering spring loaded cam follower hook of said cell as said cell is driven vertically from said portal engagement device to said vertical portal to thereby disengage said cell from said cell carrier.

13. The pass-through mechanism of claim 12, additionally comprising an interlock gate inserted at said cam state machine to prevent further spring bias movement of said spring loaded cam follower hook from said position of state C.; said interlock gate withdrawn at state D.

14. The pass-through mechanism of claim 13, additionally comprising an interlock cam of said gate with respect to said portal engagement device, such that said upward movement of said portal engagement device inserts said interlock gate, and said downward movement of said portal engagement device releases said interlock gate to allow withdrawal of said interlock gate.

15. The pass-through mechanism of claim 11, wherein said portal engagement device comprises at least one rack configured to engage at least one pinion of said cell, said at least one pinion configured to drive said cell vertically, and said portal engagement device comprises at least one pin configured to engage a vertical portal.

* * * * *